(12) United States Patent
Wenzel

(10) Patent No.: US 9,188,993 B2
(45) Date of Patent: Nov. 17, 2015

(54) SYSTEMS AND METHODS FOR SENSING DEW POINT IN A BUILDING SPACE

(71) Applicant: Johnson Controls Technology Company, Holland, MI (US)

(72) Inventor: Michael J. Wenzel, Oak Creek, WI (US)

(73) Assignee: Johnson Controls Technology Company, Holland, MI (US)

( * ) Notice: Subject to any disclaimer, the term of this patent is extended or adjusted under 35 U.S.C. 154(b) by 449 days.

(21) Appl. No.: 13/668,184

(22) Filed: Nov. 2, 2012

(65) Prior Publication Data

US 2014/0129044 A1 May 8, 2014

(51) Int. Cl.
*G05B 13/02* (2006.01)
*G05D 23/19* (2006.01)

(52) U.S. Cl.
CPC .............. *G05D 23/19* (2013.01); *G05B 13/021* (2013.01); *G05B 2219/2642* (2013.01)

(58) Field of Classification Search
CPC ..................... G05B 13/021; G05B 2219/2642; Y02B 30/545; G05D 23/19
USPC ...... 700/276, 278, 299, 300; 236/44 C, 44 R, 236/91 R, 91 C, 91 D, 91 F; 165/222, 223, 165/224, 225, 229, 230; 374/16, 28
See application file for complete search history.

(56) References Cited

U.S. PATENT DOCUMENTS

| | | | | |
|---|---|---|---|---|
| 5,139,344 A * | 8/1992 | Mutter | .............................. | 374/28 |
| 5,816,704 A * | 10/1998 | Campbell et al. | ................ | 374/28 |
| 5,915,473 A * | 6/1999 | Ganesh et al. | ................. | 165/222 |
| 7,165,412 B1 * | 1/2007 | Bean, Jr. | ...................... | 62/259.2 |
| 7,177,561 B2 * | 2/2007 | Serita | ............................... | 399/44 |
| 7,234,860 B2 * | 6/2007 | Jensen et al. | ..................... | 374/28 |
| 7,325,410 B1 * | 2/2008 | Bean, Jr. | .......................... | 62/137 |
| 8,118,236 B2 * | 2/2012 | Lestage et al. | .............. | 236/44 C |
| 8,155,797 B2 * | 4/2012 | Wiese | ........................... | 700/300 |
| 8,214,085 B2 * | 7/2012 | Boudreau et al. | ............. | 700/276 |
| 2005/0152431 A1 * | 7/2005 | Jensen et al. | ..................... | 374/16 |
| 2006/0086112 A1 * | 4/2006 | Bloemer et al. | ............. | 62/176.6 |
| 2008/0073439 A1 * | 3/2008 | Lestage et al. | .............. | 236/44 A |
| 2010/0126032 A1 * | 5/2010 | Kim et al. | ......................... | 34/79 |
| 2010/0307733 A1 | 12/2010 | Karamanos et al. | | |
| 2011/0155354 A1 | 6/2011 | Karamanos et al. | | |
| 2011/0186643 A1 * | 8/2011 | Dazai | .......................... | 236/44 C |
| 2012/0071082 A1 | 3/2012 | Karamanos | | |
| 2012/0118535 A1 | 5/2012 | Williams | | |
| 2012/0245739 A1 * | 9/2012 | Grabon et al. | ................ | 700/276 |
| 2012/0295532 A1 * | 11/2012 | Bagwell et al. | ............... | 454/237 |
| 2013/0199772 A1 * | 8/2013 | Fischer et al. | ................. | 165/287 |

OTHER PUBLICATIONS

Air Commodities Inc., Trox® Technik: Chilled Beam Design Guide, dated Jan. 2009, 68 pages.

* cited by examiner

*Primary Examiner* — Charles Kasenge
(74) *Attorney, Agent, or Firm* — Foley & Lardner LLP

(57) ABSTRACT

A method of maintaining a temperature of a surface in a building space to be above a dew point of the building space includes calculating a dew point based on a temperature measurement and a relative humidity measurement. The method further includes estimating a safety margin associated with the dew point calculation, determining a minimum temperature of the surface, wherein the minimum temperature is a function of the dew point and the safety margin, and commanding a first component of a building automation system to adjust a current temperature of the surface to be greater than the minimum temperature.

24 Claims, 5 Drawing Sheets

SYSTEMS AND METHODS FOR SENSING DEW POINT IN A BUILDING SPACE

BACKGROUND

The present disclosure generally relates to the field of building automation systems. The present invention more particularly relates to systems and methods for sensing dew point using a temperature sensor and a humidity sensor.

Condensation or dew may occur on a surface when the temperature of the surface is lower than the dew point temperature of the air. Condensation on the surface may collect and cause dripping onto the "working" space below the surface. Condensation can be problematic when the working space underneath the surface is sensitive to moisture. For example, the working space may have documents, electrical equipment, and other items that may be damaged or destroyed when exposed to moisture.

In applications where there is a cooled and exposed surface in a zone, it is important to keep the dew point of the zone below the temperature of the surface or the temperature of the surface above the dew point of the zone. Condensation may occur in numerous places in a building space. For example, condensation may occur on exposed pipes. Condensation may also arise in chilled beam cooling systems. Chilled beam cooling systems employ cool water passed through a beam near the ceiling to cool air in the zone. Natural convection and/or supplemental heating, ventilation, and air conditioning (HVAC) systems are used to circulate the conditioned air to the lower, working space of the zone. Because the heat exchanger is exposed to working space below, it is necessary to monitor the dew point in the zone when chilled beam cooling is working. Chilled beam cooling systems may be passive or active. Active chilled beams may include components (e.g., air handling unit, fans, ducts) for delivering a supplemental air supply into the zone. The supplemental air supply may be pretreated to control ventilation, temperature, and/or humidity in the zone. The supplemental air supply may act to induce air in the zone across the heat exchanger. Passive chilled beams may not include a supplemental air supply to induce movement of air in the zone and rely on natural convention for air movement.

Problems associated with condensation may be solved with proper monitoring and control of the dew point. However, dedicated dew point sensors can be prohibitively expensive when needed to monitor the dew point in many zones. Additionally, the uncertainty in the dew point measurement by a dedicated dew point sensor is non-zero and may not be specified by a manufacturer.

SUMMARY

One embodiment of the invention relates to a computerized method of maintaining a temperature of a surface in a building space above a dew point of the building space. The method includes receiving a temperature of the building space. The method includes receiving a relative humidity of the building space. The method includes receiving at least one mathematical error associated with the temperature of the building space and at least one mathematical error associated with the relative humidity. The method includes calculating the dew point using the temperature of the building space and the relative humidity. The method includes calculating a mathematical uncertainty for the dew point using the at least one mathematical error associated with the temperature of the building space and the at least one mathematical error associated with the relative humidity. The method includes determining a minimum temperature of the surface in the building space. The minimum temperature is a sum of the dew point and the mathematical uncertainty. The method includes receiving a current temperature of the surface in the building space. The method includes commanding, when the current temperature is greater than the minimum temperature, a first component of a building automation system to maintain the current temperature. The method includes commanding, when the current temperature is less than the minimum temperature, a first component of the building automation system to increase the current temperature.

Another embodiment of the invention relates to a controller for maintaining a temperature of a surface in a building space above a dew point of the building space. The controller includes a processing circuit configured to receive a temperature of the building space. The processing circuit is configured to receive a relative humidity of the building space. The processing circuit is configured to receive at least one mathematical error associated with the temperature of the building space and at least one mathematical error associated with the relative humidity. The processing circuit is configured to calculate the dew point using the temperature of the building space and the relative humidity. The processing circuit is configured to calculate a mathematical uncertainty for the dew point using the at least one mathematical error associated with the temperature of the building space and the at least one mathematical error associated with the relative humidity. The processing circuit is configured to determine a minimum temperature of the surface in the building space. The minimum temperature is a sum of the dew point and the mathematical uncertainty. The processing circuit is configured to receive a current temperature of the surface in the building space. The processing circuit is configured to command, when the current temperature is greater than the minimum temperature, a first component of a building automation system to maintain the current temperature. The processing circuit is configured to command, when the current temperature is less than the minimum temperature, a first component of the building automation system to increase the current temperature.

Yet another embodiment of the invention relates to a computerized method of maintaining a dew point of a building space below a temperature of a surface in the building space. The method includes receiving a temperature of the building space. The method includes receiving a relative humidity of the building space. The method includes receiving at least one mathematical error associated with the temperature of the building space and at least one mathematical error associated with the relative humidity. The method includes calculating the dew point using the temperature of the building space and the relative humidity. The method includes calculating a mathematical uncertainty for the dew point using the at least one mathematical error associated with the temperature of the building space and the at least one mathematical error associated with the relative humidity. The method includes determining a maximum dew point. The maximum dew point is a sum of the dew point and the mathematical uncertainty. The method includes commanding, when the dew point is less than the maximum dew point, a second component of a building automation system to maintain at least one of the temperature and the relative humidity of the building space. The method includes commanding, when the dew point is greater than the maximum dew point, the second component of the building automation system to decrease at least one of the temperature and the relative humidity of the building space.

Yet another embodiment of the invention relates to a controller for maintaining a dew point of a building space below a temperature of a surface in the building space. The controller includes a processing circuit configured to receive a temperature of the building space. The processing circuit is configured to receive a relative humidity of the building space. The processing circuit is configured to receive at least one mathematical error associated with the temperature of the building space and at least one mathematical error associated with the relative humidity. The processing circuit is configured to calculate the dew point using the temperature of the building space and the relative humidity. The processing circuit is configured to calculate a mathematical uncertainty for the dew point using the at least one mathematical error associated with the temperature of the building space and the at least one mathematical error associated with the relative humidity. The processing circuit is configured to command, when the dew point is less than the maximum dew point, a second component of a building automation system to maintain at least one of the temperature and the relative humidity of the building space. The processing circuit is configured to command, when the dew point is greater than the maximum dew point, the second component of the building automation system to decrease at least one of the temperature and the relative humidity of the building space.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which.

DESCRIPTION

Before turning to the figures, which illustrate the exemplary embodiments in detail, it should be understood that the disclosure is not limited to the details or methodology set forth in the description or illustrated in the figures. It should also be understood that the terminology is for the purpose of description only and should not be regarded as limiting.

Referring generally to the Figures, a computer system for automatically determining dew point and associated uncertainties for condensation prevention are shown and described. The computer system may be utilized in conjunction with a plurality of building automation or management systems, subsystems, or as a part high level building automation system. For example, the computer system may be a part of a Johnson Controls METASYS building automation system (BAS).

One or more embodiments of the invention utilize a processing circuit in conjunction with a temperature sensor and humidity sensor to calculate the dew point. One or more embodiments may calculate an uncertainty in the dew point calculation. One or embodiments may determine a total error margin associated with the dew point calculation. The total error margin may be described as a safety margin, i.e., a difference that should be maintained between the dew point and the surface temperature to prevent condensation. The total error margin may include a measurement margin, a dynamic margin, and a location margin. One or more embodiments may determine an upper limit of the dew point calculation (e.g., a minimum safe surface temperature and/or a maximum dew point temperature). One or more embodiments may automatically (e.g., without user intervention) adjust a chilled beam system so that the surface temperature will be maintained above the upper limit. One or more embodiments may automatically adjust the humidity and/or temperature of a zone to maintain a dew point below the upper limit.

One or more embodiments of the invention advantageously and automatically maintain a dew point and/or surface temperature to avoid condensation on a cooled surface. One or more embodiments advantageously avoid the costs associated with implementing dedicated dew point sensors. One or more embodiments advantageously utilize sensors that may already exist in a zone.

Figure 1A:
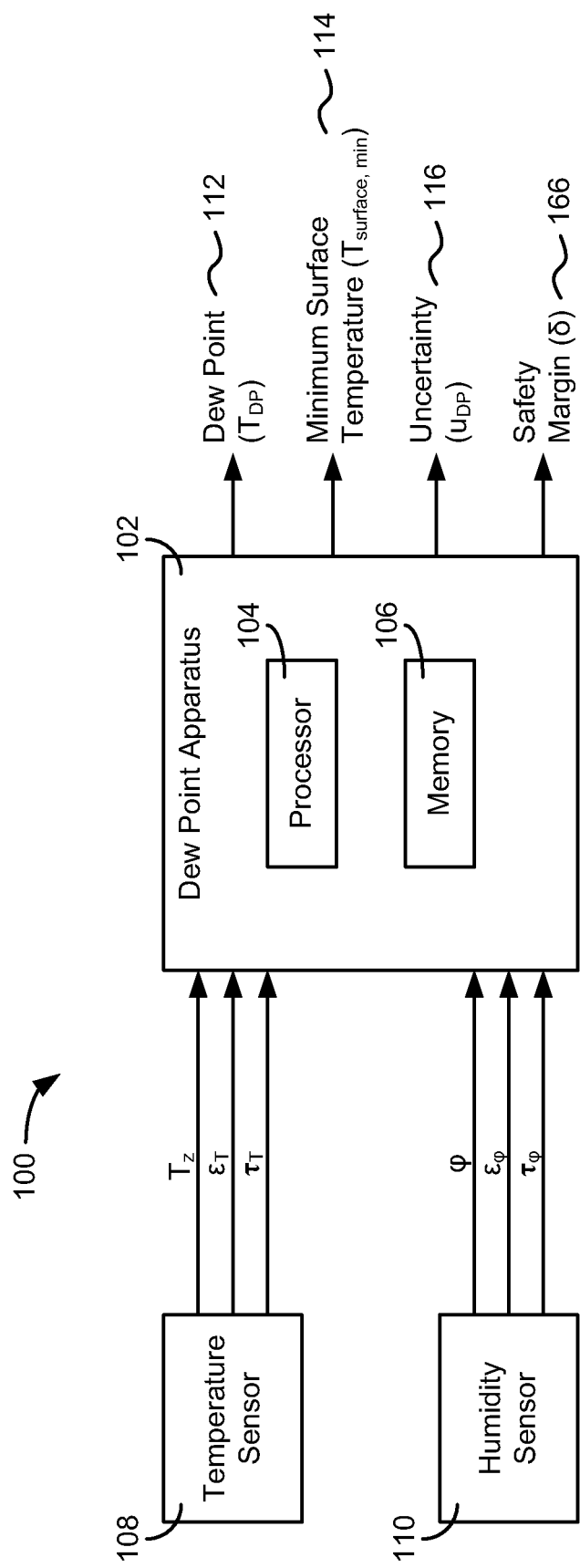
FIG. 1A is a block diagram of an environment for a dew point apparatus, according to an exemplary embodiment.

Referring now to FIG. 1A, a block diagram of environment 100 for a dew point apparatus 102 is shown, according to an exemplary embodiment. Environment 100 is shown to include a temperature sensor 108. Temperature sensor 108 may be any device configured to detect, measure, and/or monitor the dry bulb temperature of a zone containing a surface on which condensation may occur. A surface on which condensation may occur may be described as a cooled surface. Environment 100 is shown to include a humidity sensor 110. Humidity sensor 110 may be any device configured to detect, measure, and/or monitor the relative humidity of a zone containing a surface on which condensation may occur. Advantageously, temperature sensor 108 and humidity sensor 110 may be devices that already exist in a zone or are standard devices that would be ordinarily installed in a zone. In some embodiments, temperature sensor 108 and humidity sensor 110 are separate devices. In other embodiments, temperature sensor 108 and humidity sensor 110 are part of the same device. While the embodiment of FIG. 1A only shows one temperature sensor 108 and one humidity sensor 110, other embodiments may contain more than one of each sensor. For example, a first temperature sensor and a first humidity sensor may be placed nearer to the condensation surface (e.g., on a chilled beam). A second temperature sensor and a second humidity sensor may be placed further from the cooled surface (e.g., on a wall of the zone). Two or more sets of sensors may be advantageously utilized in monitoring differences in measurements arising because of the location of the sensors (i.e., location uncertainty).

Environment 100 also includes a dew point apparatus 102. Dew point apparatus 102 may include a processing circuit, with processor 104 and memory 106. Dew point apparatus 102 is described in more detail in the discussion of FIG. 1B. Dew point apparatus 102 may be configured to carry out process 200 (FIG. 2), process 300 (FIG. 3), process 400 (FIG. 4), and/or other process described herein. For a particular zone, dew point apparatus 102 may receive the dry bulb temperature ($T_Z$) from temperature sensor 108 and a relative humidity ($\phi$) from humidity sensor 110. Dew point apparatus 102 may also receive measurement errors associated with the temperature sensor ($\epsilon_T$) and the humidity sensor ($\epsilon_\phi$). The measurement errors may be random or systematic errors that arise from mechanical and/or computational limitations on the precision and/or accuracy of the sensors 108, 110. Dew point apparatus 102 may also receive the time constants associated with the temperature sensor ($\tau_T$) and the humidity sensor ($\tau_\varphi$). The time constants may describe the time ("sensor lag") for the sensors 108, 110 to detect a change in the temperature and humidity, respectively, of the zone.

Dew point apparatus 102 may calculate a dew point 112 ($T_{DP}$) based on the dry bulb temperature and relative humidity received from the temperature sensor 108 and humidity sensor 110, respectively. Dew point 112 may be calculated using the psychometric equations, which describe the relationship between dew point, dry bulb temperature, and humidity.

Dew point apparatus 102 may calculate a total safety margin 166 ($\delta$) associated with the dew point calculation. The safety margin $\delta$ 166 may be based on measurement margin $\delta_{meas}$, dynamic margin $\delta_{dyn}$, and/or location margin $\delta_{loc}$. The measurement margin $\delta_{meas}$ includes random and/or systematic errors associated with the sensors, method, etc., used to make the measurements. In some embodiments, the measurement margin may depend on a confidence interval input (e.g., when a normal distribution is used for the probabilistic meaning of the measurement uncertainty, as described in greater detail below). Dynamic margin $\delta_{dyn}$ includes the errors caused by the time lag from the temperature and humidity measurements (e.g., the time required for the sensors to respond to changes in zone conditions). Location margin $\delta_{loc}$ includes errors caused by the fact that the sensors are not placed in near proximity to the surface on which condensation may form. For example, the location margin may be a function of the dew point at the sensors' location and the dew point at the cooled surface.

Safety margin 166 may be the total margin (or any function of the measurement margin, dynamic margin, and/or location margin). In some embodiments, only certain (and not all) of the measurement margin $\delta_{meas}$, dynamic margin $\delta_{dyn}$, and location margin $\delta_{loc}$ may be calculated. For example, location margin $\delta_{loc}$ may not be calculated when the humidity distribution of a zone is known to be uniform. In that case, sensors that are located, e.g., on/near a cooled surface and further away from a cooled surface may not generate measurements that are different because of the sensors' location. According to an exemplary embodiment, all three sources of error are accounted for and a (total) safety margin 166 is calculated.

According to an exemplary embodiment, safety margin 166 is a difference that should be maintained between the dew point and the temperature of the cooled surface. In some embodiments, safety margin 166 may be used to define multiple control regimes for the dew point apparatus 102. A standard control regime may be implemented when the difference between the dew point and surface temperature (e.g., a temperature threshold) is greater than safety margin 166. According to an exemplary embodiment, during standard control, the surface temperature is adjusted (e.g., increased) to prevent condensation. A high limit control regime may be implemented when the difference between the dew point and the surface temperature (e.g., a temperature threshold) is less than safety margin 166. According to an exemplary embodiment, during high limit control, the dew point (i.e., humidity and/or temperature of the zone) is adjusted (e.g., decreased) to prevent condensation.

Dew point apparatus 102 may calculate a minimum surface temperature 114 ($T_{surface,min}$) that should be maintained in order to prevent condensation. According to an exemplary embodiment, minimum surface temperature 114 is the upper limit of the dew point provided by the safety margin (i.e., $T_{surface,min}=T_{DP}+\delta$). Dew point apparatus 102 may automatically (e.g., without user intervention) transmit commands to, e.g., a chilled beam system, to maintain the surface temperature of the chilled beam above the upper limit (i.e., $T_{surface}>T_{DP}+\delta$). In some embodiments, the upper limit may also be used to determine a maximum dew point as reported by the dew point apparatus ($T_{DP,max}=T_{surface}-\delta$). Dew point apparatus 102 may automatically transmit commands, e.g., components of an HVAC system, to maintain a current dew point below the surface temperature minus the safety margin ($T_{DP,current}<T_{surface}-\delta$). The dew point may be controlled by adjusting the humidity and/or temperature of supplemental air in the zone. Based on the psychometric equations, dew point increases when relative humidity and/or temperature increases and vice versa. Thus, when humidity and/or temperature of a zone may be controlled, condensation may be prevented using dew point apparatus 102 in at least two ways: (1) $T_{surface}$ may be increased so that $T_{surface}>T_{DP}+\delta$; and (2) $T_{DP,current}$ may be decreased so that $T_{DP,current}<T_{surface}-\delta$. One, the other, or both methods of preventing condensation may be utilized with dew point apparatus 102.

Dew point apparatus 102 may calculate a dew point uncertainty 116 ($u_{DP}$). The dew point uncertainty 116 may be the uncertainty in the dew point calculation found by propagating the error of the temperature and humidity measurement through the dew point calculation. According to an exemplary embodiment, the measurement margin ($\delta_{meas}$) is equal to the dew point uncertainty 116.

Environment 100 may also include one or more systems containing surfaces on which condensation may form. For example, environment 100 may include active or passive chilled beam systems. Environment 100 may also include exposed pipes utilized in various building systems. The systems with cooled surface(s) may contain mechanisms for detecting, measuring, and/or monitoring the temperature of the cooled surface. The measured surface temperatures may be transmitted to and received at dew point apparatus 102 and/or other BAS components responsible for maintaining the dew point and/or surface temperature to prevent condensation.

Figure 1B:
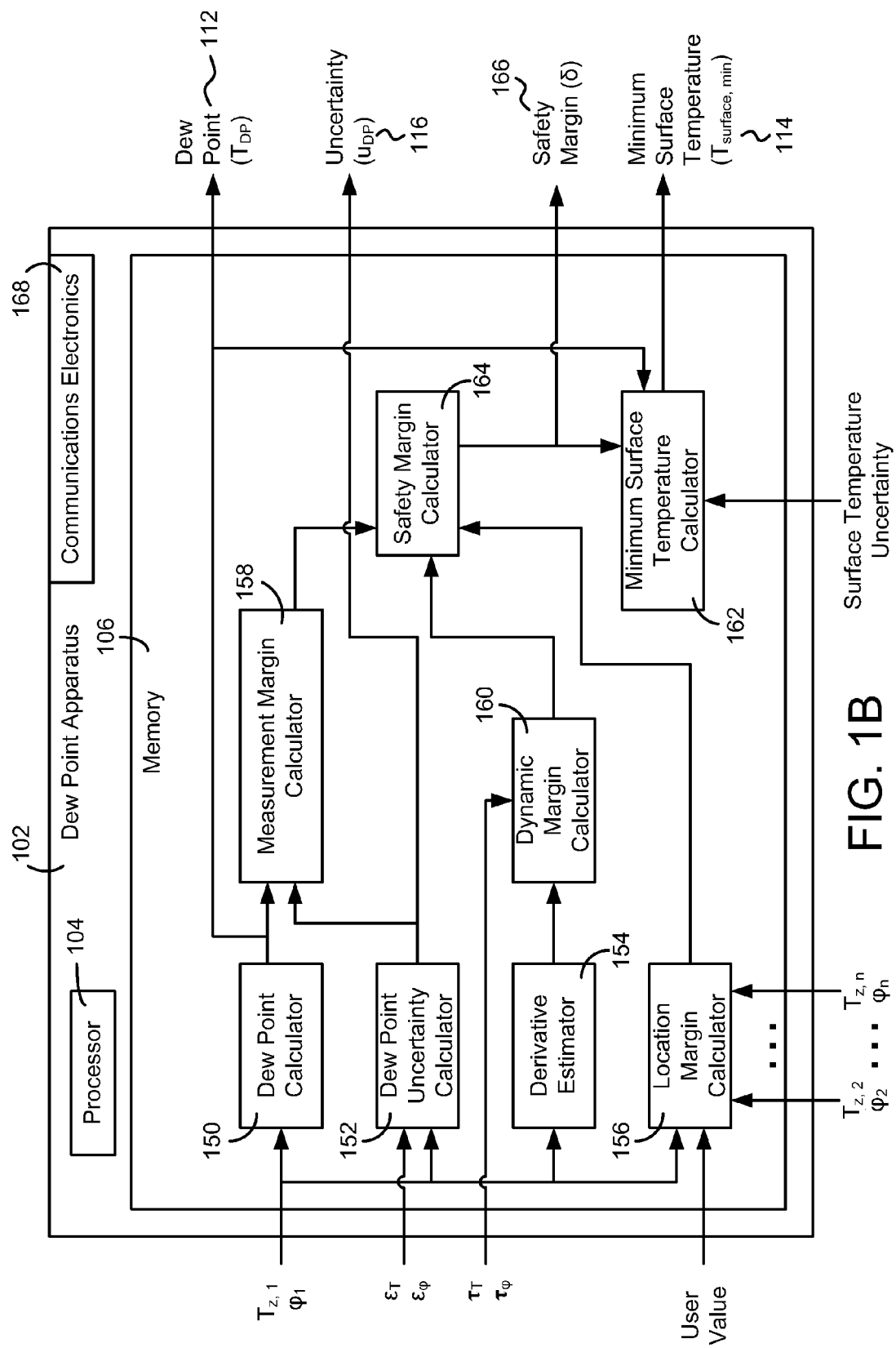
FIG. 1B is a detailed block diagram of the dew point apparatus of FIG. 1A, according to an exemplary embodiment.

Referring to FIG. 1B, a detailed block diagram of the dew point apparatus 102 of FIG. 1A is shown, according to an exemplary embodiment. Dew point apparatus 102 may be configured to carry out process 200 (FIG. 2), process 300 (FIG. 3), process 400 (FIG. 4), and/or other process described herein. Dew point apparatus 102 may be configured to receive temperature, relative humidity, measurement error, and time constants from one or more temperature sensors and humidity sensors in a zone. Dew point apparatus 102 may be configured to calculate dew point 112, uncertainty 116, minimum surface temperature 114, and safety margin 166. Dew point apparatus 102 may be configured to automatically transmit commands to one or more BAS components to cause an adjustment to the surface temperature of a cooled surface and/or to cause an adjustment in the temperature, humidity, and/or dew point of a room. Dew point apparatus 102 may be configured to determine a control regime based on the dew point, the surface temperature, and safety margin 116, and automatically transmit commands based on the control regime.

Dew point apparatus 102 includes a processing circuit. The processing circuit includes processor 104 and memory 106. Processor 104 can be implemented as a microprocessor, general purpose processor, an application specific integrated circuit (ASIC), one or more field programmable gate arrays (FPGAs), a group of processing components, or other suitable electronic processing components. Memory 106 is one or more devices (e.g., RAM, ROM, Flash memory, hard disk storage, etc.) for storing data and/or computer code for completing and/or facilitating the various processes and modules described in the present disclosure. Memory 106 may be or include volatile memory or non-volatile memory. Memory 106 may include database components, object code components, script components, or any other type of information structure for supporting the various activities and information structures described in the present disclosure. According to an exemplary embodiment, memory 106 is communicably connected to processor 104 via a processing circuit and includes computer code for executing (e.g., by a processing circuit and/or processor 104) one or more processes described herein.

According to an exemplary embodiment, the processing circuit of dew point apparatus 102 is integrated within a single computer (e.g., one server, one housing, etc.). In various other exemplary embodiments, the processing circuit can be distributed across multiple servers or computers (e.g., that can exist in distributed locations). In another exemplary embodiment, the processing circuit may integrated with a smart building manager that manages multiple building systems. In other embodiments, the processing circuit may exist relatively independently of other building automation systems. The processing circuit may be configured to receive data from, operate on data received from, and transmit data to one or more building systems/subsystems.

The processing circuit of dew point apparatus 102 is configured to include communications electronics 168. Communications electronics 168 may be a network interface, and the processing circuit may be configured to communicate with one or more BAS components via a network connection provided by communications electronics 168. For example, measured zone temperature $T_z$ and measured relative humidity $\phi$ may be received at dew point calculator 150 from temperature sensor 108 and humidity sensor 110, respectively. For example, commands to adjust temperature of the chilled beam system may be automatically transmitted from dew point apparatus 102 to a chilled beam system controller via communications electronics 168. For example, a current surface temperature from a chilled beam system may be received at dew point apparatus 102 via communications electronics 168. Communications electronics 168 can be or include wired or wireless interfaces (e.g., jacks, antennas, transmitters, receivers, transceivers, wire terminals, etc.) for conducting data communications with another system or network. For example, communications electronics 168 can include an Ethernet card and port for sending and receiving data via an Ethernet-based communications network. In another example, communications electronics 168 includes a WiFi transceiver for communicating via a wireless communications network. Communications electronics 168 may be configured to communicate via local area networks or wide area networks (e.g., the Internet, a building WAN, etc.).

Memory 106 includes dew point calculator 150. Dew point calculator 150 receives the measured zone temperature ($T_z$ or T, in the equations below) from temperature sensor 108. Dew point calculator 150 also receives the measured relative humidity $\phi$ from humidity sensor 110. Dew point calculator 150 may include computer executable instructions for calculating a dew point of a zone based on measurements of relative humidity and dry bulb temperature (e.g., received from humidity sensor 110 and temperature sensor 108, respectively). According to an exemplary embodiment, for temperatures above freezing, the dew point $T_{DP}$ is calculated based on the following psychometric equations:

$$T_{DP} = c_{14} + c_{15}\alpha + c_{16}\alpha^2 + c_{17}\alpha^3 + c_{18}p_w^{0.1984} \quad (1)$$

$$p_w = \phi \exp\{c_8 T^{-1} + c_9 + c_{10}T + c_{11}T^2 + c_{12}T^3 + c_{13}\ln(T)\}, \quad (2)$$

$$\alpha = \ln(p_w) = \ln(\phi) + c_8 T^{-1} + c_9 + c_{10}T + c_{11}T^2 + c_{12}T^3 + c_{13}\ln(T), \quad (3)$$

where T is the temperature in Rankine, $\phi$ is the relative humidity (as a fraction), $p_w$ is the partial pressure of water, and $T_{DP}$ is the dew point temperature. Coefficients $c_8$-$c_{18}$ are set forth below:

c8=−1.0440397e4;
c9=−1.1294650e1;
c10=−2.7022355e-2;
c11=1.2890360e-5;
c12=−2.4780681e-9;
c13=6.5459673;
c14=100.45;
c15=33.193;
c16=2.319;
c17=0.17074;
c18=1.2063.

Memory 106 includes dew point uncertainty calculator 152. Dew point uncertainty calculator 152 receives sensor uncertainty (or error) $\epsilon_T$, $\epsilon_\phi$, associated with the temperature sensor 108 and the humidity sensor 110, respectively. The error may be specified by a manufacturer of the sensors or may be estimated by comparing the measured values against known, true values. According to an exemplary embodiment, dew point uncertainty calculator 152 outputs the steady-state dew point uncertainty $u_{DP}$ found by propagating the sensor uncertainties through the dew point calculation. The dew point uncertainty $u_{DP}$ may be a fixed function of humidity and temperature for a given set of humidity and temperature sensors. This uncertainty may be updated based on the function any time the temperature or humidity reads a different value.

The dew point temperature, as a function of dry bulb temperature and relative humidity, is relatively flat. Thus, for small deviations from a given point, the dew point function can be well approximated by its first order Taylor series representation. The Taylor series representation can be used to analyze how small measurement errors in the temperature and humidity can affect the dew point calculation. The Taylor series expansion is given by $$T_d(T + \varepsilon_T, \phi + e_\phi) = T_d(T, \phi) + \left(\nabla T_d \Big|_\phi^T\right)\begin{bmatrix}\varepsilon_T \\ \varepsilon_\phi\end{bmatrix}, \quad (4)$$

where $\nabla T_d$ is the gradient of the dew point with respect to temperature and humidity, and $\epsilon_T$ and $\epsilon_\phi$ are the measurement errors in temperature and humidity, respectively.

The measurement uncertainty for sensors is typically stated as plus or minus some value. In this analysis, the probabilistic meaning of the measurement uncertainty will be assumed to be one of the following:

(1) Normal distribution: a given sensor measurement has error $\epsilon$, which follows a normal distribution with zero mean when taken over the population of all sensors and possible measurements. The uncertainty value u defines the 1−α confidence range of the sensor error; i.e., P(−u<ε<u)=1−α·α is a chosen value, e.g., 0.05.

(2) Bounded error: a given sensor measurement has error $\epsilon$, which is bounded by the stated uncertainty value; i.e., −u<ε<u.

If either of these definitions of sensor uncertainty is used for both the temperature sensor 108 and humidity sensor 110, and the first-order Taylor series approximation of the dew point equation is valid, then similar statements about the uncertainty of dew point apparatus 102 can be made:

(i) Normal distribution: the dew point measurement has error $\epsilon_{Td}$, which follows a normal distribution with zero mean when taken over the population of all sensors and possible measurements. The uncertainty value u defines the $1-\alpha$ confidence range of the sensor error; i.e., $P(-u_{meas} < \epsilon_{Td} < u_{meas}) = 1-\alpha \cdot \alpha$ is a chosen value, e.g., 0.05 (same $\alpha$ used to define the temperature and humidity sensors).

(ii) Bounded error: the dew point measurement has error $\epsilon_{Td}$, which is bounded by the stated uncertainty value; i.e., $-u_{Td} < \epsilon_{Td} < u_{Td}$.

Thus, if the error in the temperature and humidity sensors is defined as in either 1 or 2, the stated uncertainty of the dew point apparatus can be defined as in i or ii, respectively. The equations used to calculate the measurement uncertainty in the dew point $u_{Td}$ are derived below, for the normal distribution and bounded error definitions of uncertainty, respectively.

Using the normal distribution definition of uncertainty, it is assumed that the measurement errors for temperature and humidity are normally distributed and independent;

$$\begin{bmatrix} \varepsilon_T \\ \varepsilon_\phi \end{bmatrix} \sim N\left(0, \begin{bmatrix} \sigma_T^2 & 0 \\ 0 & \sigma_\phi^2 \end{bmatrix}\right), \tag{5}$$

where $\sigma_T^2$ is the variance of the temperature measurement error, and $\sigma_\phi^2$ is the variance of the relative humidity measurement error. To find the variance, the uncertainty is divided by the inverse of standard normal distribution, $$\sigma^2 = \left(\frac{u}{z_{\alpha/2}}\right)^2, \tag{6}$$

$$z_{\alpha/2} = Z^{-1}(1 = \alpha/2).$$

Using the first-order Taylor series expansion (equation 4), the error in the dew point calculation is given by $$\varepsilon_{Td} = \left(\nabla T_d \big|_\phi^T\right) \begin{bmatrix} \varepsilon_T \\ \varepsilon_\phi \end{bmatrix} = \begin{bmatrix} \frac{\partial T_d}{\partial T} \big|_\phi & \frac{\partial T_d}{\partial \phi} \big|_\phi \end{bmatrix} \begin{bmatrix} \varepsilon_T \\ \varepsilon_\phi \end{bmatrix}. \tag{7}$$

Thus, the error in the calculation of the dew point is a linear function of the error in the temperature and relative humidity measurements. Because the errors in the temperature and relative humidity are normally distributed, so is the error in the dew point. Furthermore, the variance is given by $$E\{\varepsilon_{Td}\varepsilon_{Td}^T\} = \begin{bmatrix} \frac{\partial T_d}{\partial T} \big|_\phi & \frac{\partial T_d}{\partial \phi} \big|_\phi \end{bmatrix} \begin{bmatrix} \sigma_T^2 & 0 \\ 0 & \sigma_\phi^2 \end{bmatrix} \begin{bmatrix} \frac{\partial T_d}{\partial T} \big|_\phi & \frac{\partial T_d}{\partial \phi} \big|_\phi \end{bmatrix}^T, \tag{8}$$

$$E\{\varepsilon_{Td}\varepsilon_{Td}^T\} = \left(\frac{\partial T_d}{\partial T}\big|_\phi\right)^2 \left(\frac{u_T}{z_{\alpha/2}}\right)^2 + \left(\frac{\partial T_d}{\partial \phi}\big|_\phi\right)^2 \left(\frac{u_\phi}{z_{\alpha/2}}\right)^2. \tag{9}$$

Thus, the uncertainty (scaled version of the standard deviation) that may be quoted for dew point apparatus 102 is $$u_{Td} = z_{\alpha/2} \sqrt{\left(\frac{\partial T_d}{\partial T}\big|_\phi\right)^2 \left(\frac{u_T}{z_{\alpha/2}}\right)^2 + \left(\frac{\partial T_d}{\partial \phi}\big|_\phi\right)^2 \left(\frac{u_\phi}{z_{\alpha/2}}\right)^2} \tag{10}$$

$$= \sqrt{\left(\frac{\partial T_d}{\partial T}\big|_\phi\right)^2 (u_T)^2 + \left(\frac{\partial T_d}{\partial \phi}\big|_\phi\right)^2 (u_\phi)^2}.$$

Using the bounded error definition of uncertainty (the measurement errors are bounded by the listed uncertainty), similar analysis may be performed. The error is again given by $$\varepsilon_{Td} = \left(\nabla T_d \big|_\phi^T\right) \begin{bmatrix} \varepsilon_T \\ \varepsilon_\phi \end{bmatrix} = \begin{bmatrix} \frac{\partial T_d}{\partial T} \big|_\phi & \frac{\partial T_d}{\partial \phi} \big|_\phi \end{bmatrix} \begin{bmatrix} \varepsilon_T \\ \varepsilon_\phi \end{bmatrix}. \tag{11}$$

Finding a bound on the dew point calculation error may be characterized as a linear programming problem; i.e., what is the maximum value of $\epsilon_{Td}$ subject to the constraints $-u_T \leq \epsilon_T \leq u_T$ and $-u_\phi \leq \epsilon_\phi \leq u_\phi$. The linear programming problem must have a maximum at a vertex of the valid region defined by the constraints. In this case, the maximum occurs when the direction of the error matches the direction of the partial derivative. Because dew point is a monotonically increasing function of relative humidity and dry bulb temperature, the maximum occurs when both the error terms take on their positive maximum value. The resultant error bound for the dew point is $$u_{Td} = \begin{bmatrix} \frac{\partial T_d}{\partial T} \big|_\phi & \frac{\partial T_d}{\partial \phi} \big|_\phi \end{bmatrix} \begin{bmatrix} u_T \\ u_\phi \end{bmatrix} \tag{12}$$

$$= \left(\frac{\partial T_d}{\partial T}\big|_\phi\right) u_T + \left(\frac{\partial T_d}{\partial \phi}\big|_\phi\right) u_\phi.$$

The gradient of the dew point with respect to temperature and humidity plays a role in the propagation of uncertainty in the temperature and humidity sensors to the output of dew point apparatus 102. The gradient of dew point with respect to temperature and relative humidity is calculated using the psychometric equations (equations 1, 2, and 3, above).

Starting with the dew point equation (equation 1), the chain rule is applied to each term individually, $$\frac{\partial T_d}{\partial T} = \tag{13}$$
$$c_{15} \frac{\partial \alpha}{\partial T} + 2c_{16}\alpha \left(\frac{\partial \alpha}{\partial T}\right) + 3c_{17}\alpha^2 \left(\frac{\partial \alpha}{\partial T}\right) + 0.1984 \, c_{18} p_w^{-0.8016} \left(\frac{\partial p_w}{\partial T}\right),$$

$$\frac{\partial T_d}{\partial \phi} = \tag{14}$$
$$c_{15} \frac{\partial \alpha}{\partial \phi} + 2c_{16}\alpha \left(\frac{\partial \alpha}{\partial \phi}\right) + 3c_{17}\alpha^2 \left(\frac{\partial \alpha}{\partial \phi}\right) + 0.1984 \, c_{18} p_w^{-0.8016} \left(\frac{\partial p_w}{\partial \phi}\right).$$

The derivatives of $\alpha$ and $p_w$ may be calculated:

$$\frac{\partial \alpha}{\partial \phi} = -c_8 T^{-2} + c_{13} T^{-1} + c_{10} + 2c_{11}T + 3c_{12}T^2, \tag{15}$$

-continued $$\frac{\partial \alpha}{\partial \phi} = \frac{1}{\phi}, \quad (16)$$

$$\frac{\partial p_w}{\partial T} = \frac{\partial \alpha}{\partial T} \phi \exp\{c_8 T^{-1} + c_9 + c_{10}T + c_{11}T^2 + c_{12}T^3 + c_{13}\ln(T)\}, \quad (17)$$

$$\frac{\partial p_w}{\partial \phi} = \exp\{c_8 T^{-1} + c_9 + c_{10}T + c_{11}T^2 + c_{12}T^3 + c_{13}\ln(T)\}. \quad (18)$$

Dew point uncertainty calculator 152 contains computer executable instructions for conducting these and related calculations. An exemplary embodiment of an algorithm for carrying out these calculations is set forth below. Various embodiments may utilize different algorithms.

```
prob = false; %toggles normal distribution definition (true) bounded error
definition (false)
c8 = -1.0440397e4;
c9 = -1.1294650e1;
c10 = -2.7022355e-2;
c11 = 1.2890360e-5;
c12 = -2.4780681e-9;
c13 = 6.5459673;
c14 = 100.45;
c15 = 33.193;
c16 = 2.319;
c17 = 0.17074;
c18 = 1.2063;
%sensor uncertainties
if(prob)
    ep_RH = ones(size(RHp))*2/norminv(1-0.025, 0, 1); % percent
    ep_Tf = ones(size(RHp))*1/norminv(1-0.025, 0, 1); % degree f
else
    ep_RH = ones(size(RHp))*2; % percent
ep_Tf = ones(size(RHp))*1; % degree f
    end
% Account for wider uncertainty at low and high humidity values
vals_to_change = (RHp >= 80 | RHp <= 20);
ep_RH(vals_to_change) = 2*ep_RH(vals_to_change);
% Convert to fractional humidity
RH = 0.01*RHp;
% Convert to Rankine
T = Tf + 459.67;
% Partial pressure of water
Pw = RH.*exp(c8*T.^-1 + c9 + c10*T + c11*T.^2 + c12*T.^3 +
c13*log(T));
% natural log of pw... alpha = ln(pw)
alpha = log(RH) + c8*T.^-1 + c9 + c10*T + c11*T.^2 + c12*T.^3 +
c13*log(T);
% gradient with respect to RH
dTd_dRH = (RH.^-1).*(c15 + 2*c16*alpha + 3*c17*alpha.^2) +
0.1984*c18*(Pw.^-
0.8016).*exp(c8*T.^-1 + c9 + c10*T + c11*T.^2 + c12*T.^3 +
c13*log(T));
%d_alpha d_T
da = -1*c8*T.^-2 + c10 + 2*c11*T + 3*c12*T.^2 + c13*T.^-1;
% gradient with respect to T
dTd_dT = da.*(c15 + 2*c16*alpha + 3*c17*alpha.^2 +
0.1984*c18*(Pw.^ - 0.8016).*exp(c8*T.^-1 + c9 + c10*T + c11*T.^2 +
c12*T.^3 + c13*log(T)));
% dew point temperature
Td = (c14 + c15*alpha + c16*alpha.^2 + c17*alpha.^3 + c18*Pw.^0.1984);
% dew point uncertainties
if(prob)
    ep_Td = norminv(1-0.025, 0, 1)*sqrt(0.01^2*ep_RH.^2.*
dTd_dRH.^2 + ep_Tf.^2.*dTd_dT.^2);
else
    ep_Td = 0.01*ep_RH.*dTd_dRH + ep_Tf.*dTd_dT;
end
```

Memory 106 includes measurement margin calculator 158, dynamic margin calculator 160, and location margin calculator 156. Margin calculators 156, 158, and 160 contain computer executable instructions for calculating various components of safety margin 166 ($\delta$), including measurement margin $\delta_{meas}$, dynamic margin $\delta_{dyn}$, and location margin $\delta_{loc}$, respectively.

Measurement margin calculator 158 determines the portion of the safety margin due to the measurement error of the both the temperature and the relative humidity measurements. Measurement margin calculator 158 receives the dew point uncertainty $u_{DP}$ from dew point uncertainty calculator 152. According to an exemplary embodiment, the measurement margin $\delta_{meas}$ is equal to the dew point uncertainty $u_{DP}$. As described above, the dew point uncertainty may depend on a confidence interval input (e.g., when a normal distribution is used for the probabilistic meaning of the measurement uncertainty). As a result, in some embodiments, the measurement margin $\delta_{meas}$ may also depend on the confidence interval input. In some embodiments, the measurement margin is equal to a function of the dew point uncertainty $u_{DP}$.

Dynamic margin calculator 160 receives the time constants $\tau_T$, $\tau_\phi$ for temperature sensor 108 and humidity sensor 110, respectively. A sensor's time constant indicates how fast a sensor can respond to a rapid (step) change in the property that it is measuring. The greater the time constant, the longer the sensor takes to respond and the higher maximum error the sensor can have during a ramping change in value. Time constants $\tau_T$, $\tau_\phi$ may be described as sensor lag because the time constants describe the time required for the sensors to respond to changes in zone conditions. A sensor's time constant may be specified by a manufacturer of the sensor or may be estimated by comparing the response rate of the sensor to the response rate(s) of other sensor(s) with known, true values.

According to an exemplary embodiment, the dynamic margin is a function of the derivatives of the temperature and humidity readings. That is, the dynamic margin is based on the current rates of change of the measured temperature and relative humidity. According to an exemplary embodiment, the derivatives may be estimated by derivative estimator 154. Derivative estimator 154 calculates an estimate of the derivatives with an uncertainty. That is, derivative estimator 154 calculates a confidence interval for the derivatives. The derivative estimator may use a Savitzky-Golay filter in order to estimate the derivatives and uncertainties. Other mathematical methods may be used in different embodiments.

According to an exemplary embodiment, derivative estimator 154 first estimates the noise of the temperature or humidity measurement. For example, the equation, $$s_k = \sqrt{\frac{\pi}{12}} |y_{k-1} - 2y_k + y_{k+1}|, \quad (19)$$

may be used to develop an instantaneous estimate of the standard deviation, which can then be smoothed by, e.g., an infinite impulse response filter or exponentially weighted moving average to estimate the standard deviation, $\hat{s}$, of the noise. Given the coefficients of the Savitzky-Golay filter used to estimate the derivative, a, the standard deviation of the derivative estimate, $\hat{\sigma}$, can be found by, $$\hat{\sigma} = \hat{s} \sqrt{\sum_{i=1}^{n} a_i^2}, \quad (19)$$

and in turn used to determine the uncertainty in the estimate of the derivative.

A sensor can be represented by a first-order transfer function with time constant τ:

$$H(s) = \frac{1/\tau}{s + 1/\tau}. \tag{19}$$

The response of H(s) to a ramp with slope A is $$Y(s) = \frac{A}{s^2} H(S). \tag{20}$$

Thus, the sensor's dynamic uncertainty, i.e., the difference between the ramping input and the sensor response, is given by $$E(s) = \frac{A}{s^2} - \frac{A}{s^2} \cdot \frac{1/\tau}{s + 1/\tau} = \frac{As}{s^2(s + 1/\tau)}. \tag{21}$$

Using the final value theorem, the steady-state (and the maximum) uncertainty to the ramping input is $$e_{ss} = A\tau. \tag{22}$$

According to an exemplary embodiment, dynamic margin calculator 160 takes the maximum of the derivative confidence interval and multiplies it by the time constant in order to obtain the dynamic margin. In alternative embodiments, a maximum ramp rate or slope (i.e., derivative) for temperature and humidity may be specified and multiplied by the time constant.

As shown above, the maximum dynamic error ($e_{ss}$ generally, or $\tilde{T}_{dyn\_max}$ for the temperature sensor and $\tilde{\phi}_{dyn\_max}$ for the humidity sensor) is given by:

$$\tilde{T}_{dyn\_max} = \tau_T \frac{dT_{meas}}{dt}, \tag{23}$$

$$\tilde{\phi}_{dyn\_max} = \tau_\phi \frac{d\phi_{meas}}{dt}. \tag{24}$$

Dynamic margin calculator 160 may calculate the dynamic margin by adding the respective maximum dynamic errors to both the temperature and humidity measurements, calculating the dew point using these two values, and then subtracting the calculation from the nominal dew point. According to an exemplary embodiment, the dynamic margin is forced to be greater than zero.

Location margin calculator 156 may account for differences between the dew point at the sensor location and the dew point at the cooled surface. Location margin is a function of the placement of the sensors relative the cooled surface and the humidity distribution in the room. Where the humidity is uniformly distributed, the location margin is likely to be minimal. When the humidity distribution is non-uniform, the location margin increases. In some embodiments, the location margin may be found by placing a temperature sensor and humidity sensor at or near the cooled surface for performing condensation prevention. In this case, the location margin can be set to zero because even a non-uniform humidity is unlikely to affect the readings of sensors that are near to the cooled surfaced. In some embodiments, if humidity is expected to be relatively uniformly distributed in the zone, then location margin may be set to a specified number (e.g., 1° F.) (user value from FIG. 1B). In some embodiments, location margin may be calibrated by placing a first set of humidity and temperature sensors ($T_{z,1}$ and $\phi_1$ from FIG. 1B) near the cooled surface and a second set ($T_{z,2}$ and $\phi_2$ from FIG. 1B) where the humidity and temperature are normally measured in a zone (e.g., near an entrance). The maximum deviation of these two sets of sensors may be monitored over a period of time, and the location margin may be set to this value in that zone and all similar zones. In some embodiments, multiple sets of humidity and temperature sensors ($T_{z,n}$ and $\phi_n$ from FIG. 1B) may be used to calibrate the sensors.

Memory 106 includes safety margin calculator 164. Safety margin calculator 160 receives the measurement margin from measurement margin calculator 158, dynamic margin from dynamic margin calculator 160, and the location margin from location margin calculator 156. Safety margin calculator 160 determines the total safety margin 166 (δ). According to an exemplary embodiment, safety margin 166 (δ) is a difference that should be maintained between the dew point $T_{DP}$ and the temperature of the cooled surface $T_{surface}$. Condensation may be advantageously prevented by maintaining $T_{surface} - T_{DP} > \delta$. According to an exemplary embodiment, the total safety margin δ is the sum of dynamic margin $\delta_{dyn}$, measurement margin $\delta_{meas}$, and location margin $\delta_{loc}$:

$$\delta = \delta_{meas} + \delta_{dyn} + \delta_{loc}. \tag{45}$$

The sum may be advantageously used because the randomness in each of the margins occurs at different frequencies. Randomness in the measurement margin is caused mostly by sensor calibration and has low frequency. Randomness in the location margin is caused by non-uniformity in the moisture distribution and is low frequency. Randomness in the dynamic margin is caused by the white measurement noise of the sensor and is higher frequency. Accordingly, at a single sensor calibration, all possible moisture distributions will be seen, and, at a single moisture distribution, all measurement noises will be seen. Therefore, the individual margins are advantageously added to calculate the total safety margin. In some embodiments, the total safety margin may be a different function of the one or more of the measurement margin, the dynamic margin, and the location margin.

Memory 106 includes minimum surface temperature calculator 162. Minimum surface temperature calculator 162 receives the safety margin (δ) from safety margin calculator 164 and the calculated dew point ($T_{DP}$) from dew point calculator 150. According to an exemplary embodiment, calculator 162 determines a minimum surface temperature 114, which is the upper limit of the dew point (i.e., $T_{surface,min} = T_{DP} + \delta$). Because condensation forms on the cooled surface when the surface temperature falls below the dew point, condensation may be prevented by maintaining the surface temperature of the surface above the upper limit (i.e., $T_{surface} > T_{DP} + \delta$). For example, dew point apparatus 102 may automatically transmit commands to a chilled beam system to maintain a surface temperature above the upper limit. The current surface temperature may be measured or otherwise determined, e.g., by a chilled beam system, and transmitted to dew point apparatus 102. In some embodiments, an uncertainty (e.g. measurement error) may be associated with the surface temperature. The surface temperature uncertainty may also be received by minimum surface temperature calculator 162 and accounted for in the calculation of minimum surface temperature 114. When the surface on which condensation may form is a surface of a chilled beam system, the surface temperature may be adjusted by changing the temperature of the fluid in the chilled beam.

The upper limit may be used to calculate a maximum dew point (i.e., $T_{DP,max}=T_{surface}-\delta$). In some embodiments, memory 106 may include a maximum dew point calculator instead of or in addition to minimum surface temperature calculator 162. Because condensation forms on the cooled surface when the dew point rises above the surface temperature, condensation may be prevented by maintaining the dew point below the surface temperature minus the uncertainty (i.e., $T_{DP,current}<T_{surface}-\delta$). Dew point apparatus 102 may automatically transmit commands, e.g., components of an HVAC system, to maintain a current dew point below the upper uncertainty limit. This may advantageously allow for the surface temperature of the cooled surface to be remain constant. The dew point may be adjusted by changing the temperature and/or humidity of the zone. According to an exemplary embodiment, a chilled beam system (or a zone with a chilled beam system) may include a supplemental air source, which allows the temperature and/or humidity of the zone to be changed independent of the temperature of the fluid in the chilled beam.

In some embodiments, safety margin 166 ($\delta$) may be used to implement a standard control regime and a high limit control regime. A standard control regime may be utilized when $T_{urface}-T_{DP}>\delta$. $T_{surface}-T_{DP}$ may be described as a temperature threshold. According to an exemplary embodiment, during standard control, dew point apparatus 102 may automatically transmit commands to, e.g., a chilled beam system to maintain an appropriate surface temperature for the chilled beam. Because condensation occurs when the surface temperatures falls because the dew point, the surface temperature is generally increased to prevent condensation. A high limit control regime may utilized when $T_{surface}-T_{DP}<\delta$. According to an exemplary embodiment, during high limit control, dew point apparatus 102 may automatically transmit commands to, e.g., a HVAC system to maintain the appropriate dew point. Because condensation occurs when the dew point is greater than the surface temperature, the dew point is generally decreased to prevent condensation. Dew point may be adjusted by changing the temperature and/or absolute humidity in the zone. In some embodiments, one, the other, or both regimes include receiving the current surface temperature of the cooled surface. In some embodiments, during high limit control, dew point apparatus 102 may additionally transmit commands to, e.g., a chilled beam system to increase surface temperature. In some embodiments, surface temperature of the cooled surface is adjusted during standard and high limit control. In some embodiments, dew point is adjusted during standard and high limit controls. In some embodiments, both surface temperature and the dew point are adjusted during one, the other, or both of standard control and high limit control.

In some embodiments, dew point 112, dew point uncertainty 116, minimum surface temperature 114, safety margin 166, and/or other values may be transmitted to a memory device, a user device, or another device on the building management system. The values may be transmitted via communications electronics 168. In some embodiments, the values may be transmitted to a monitoring application with several graphical user interface (GUI) elements (e.g., widgets, dashboard controls, windows, etc.). In such embodiments, dew point apparatus 102 may include GUI services or may be operably coupled to a BAS device with GUI services. According to an exemplary embodiment, a user (e.g., a BAS operator) may use web-based monitoring applications to view and navigate real time dashboards relating to the dew point and surface temperature of one or more zones. The GUI elements may list the measured and/or calculated values. A user may utilize GUI services to manually adjust dew point, surface temperature, etc. The GUI elements may also allow a BAS operator to start, modify, or end the processes described herein for preventing condensation on cooled surfaces.

The GUI elements may include charts or histograms that allow the user to visually analyze the data points. The processing circuit of dew point apparatus 102 may include one or more GUI servers, services, or engines (e.g., a web service) to support such applications. Further, in some embodiments, applications and GUI engines may be included outside of the processing circuit (e.g., as part of a smart building manager). The processing circuit may be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. The processing circuit may be configured to provide the results of any such processing to other databases, tables, XML files, or other data structures for further querying, calculation, or access by, for example, external monitoring and reporting applications.

Figure 2:
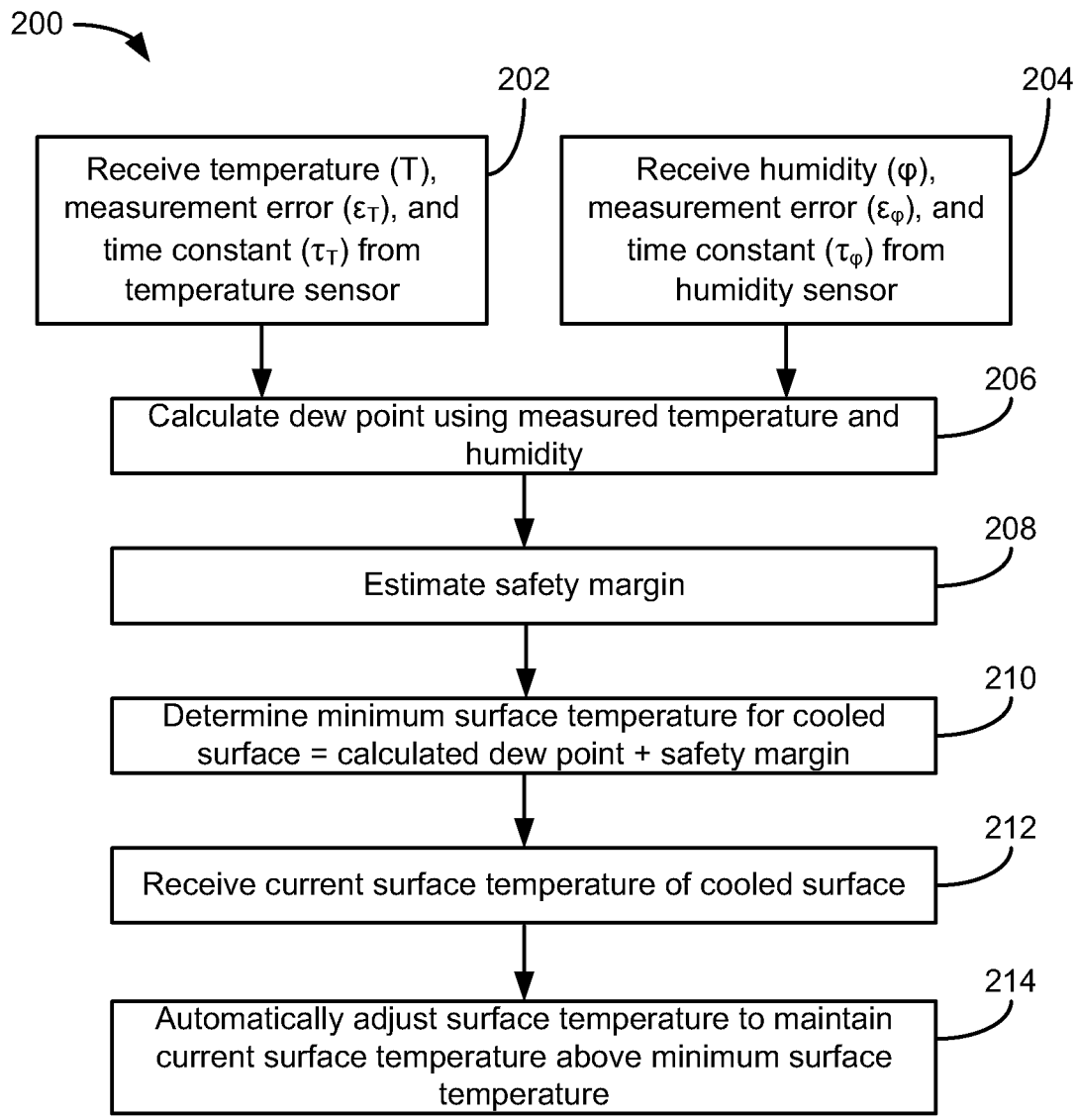
FIG. 2 is a flow diagram of a process for maintaining a surface temperature of a cooled surface above a minimum surface temperature, according to an exemplary embodiment.

Referring now to FIG. 2, a flow diagram of a process 200 for maintaining a surface temperature of a cooled surface above a minimum surface temperature is shown, according to an exemplary embodiment. Process 200 may be implemented on, e.g., the processing circuit of dew point apparatus 102.

Process 200 includes receiving data from a device configured to measure temperature (202). The device may be, e.g., temperature sensor 108 of FIG. 1A. The data includes the measured temperature, the measurement error, and the time constant of the device. The measurement error and time constant may be described as mathematical errors associated with the temperature and the relative humidity. Process 200 includes receiving data from a device configured to measure relative humidity (204). The device may be, e.g., humidity sensor 110 of FIG. 1A. The data includes the measured humidity, the measurement error, and the time constant of the device. In some embodiments, the temperature sensing device and the humidity sensing device are separate devices. In other embodiments, the same device is configured to measure temperature and humidity. Process 200 includes calculating the dew point using the measured temperature and humidity (206). As described in the discussion of dew point calculator 150 (FIG. 1B), the dew point may be calculated using the psychometric equations.

Process 200 includes estimating the safety margin (208). As described in the discussion of safety margin calculator 164, the safety margin describes a difference that should be maintained between the surface temperature of a cooled surface and the dew point to prevent condensation. The safety margin may be any function of the measurement margin, dynamic margin, and location margin. The sensor uncertainties received from the temperature sensing device and the humidity sensing device may be used to calculate measurement margin. The time constants received from the temperature sensing device and the humidity sensing device may be used to calculate dynamic margin. According to an exemplary embodiment, a maximum deviation between multiple sets of temperature sensing and humidity sensing devices is used to calculate location margin. The calculation of measurement margin, dynamic margin, and location margin is described in greater detail in the discussion of FIG. 4.

Process 200 includes determining a minimum surface temperature for a cooled surface (210). According to an exemplary embodiment, the cooled surface is part of a chilled beam system. As described in the discussion of minimum surface temperature calculator 162 (FIG. 1B), the minimum surface temperature may be a upper limit of the dew point calculation. That is, the minimum surface temperature may the sum of the dew point calculated in step 206 and the safety margin estimated in step 208.

Process 200 includes receiving the current surface temperature of the cooled surface (212). According to an exemplary embodiment, a chilled beam system may be configured to determine and transmit the current surface temperature of the cooled surface to dew point apparatus 102. In some embodiments, a temperature sensing device on or near the cooled surface may be used to determine the current surface temperature.

Process 200 includes automatically adjusting the surface temperature of the cooled surface to maintain the current surface temperature above the minimum surface temperature (214). For example, the cooled surface may be part of a chilled beam system. Dew point apparatus 102 may transmit commands to the chilled beam system to, e.g., increase the temperature of the surface temperature. This may be accomplished by increasing the temperature of the fluid in the chilled beam pipes.

In some embodiments, process 200 may additionally include determining whether the difference between the surface temperature and the dew point is greater than the safety margin. If so, process 200 includes adjusting surface temperature, as described in step 214. If the difference of the surface temperature and dew point is less than the safety margin, process 200 may include automatically adjusting the humidity and/or temperature of the zone to maintain the dew point below the maximum dew point (as described in the discussion of FIG. 3). In some embodiments, regardless of whether the safety margin is greater than or less than the current surface temperature and dew point difference, the surface temperature is adjusted, the dew point is adjusted, and/or both.

Figure 3:
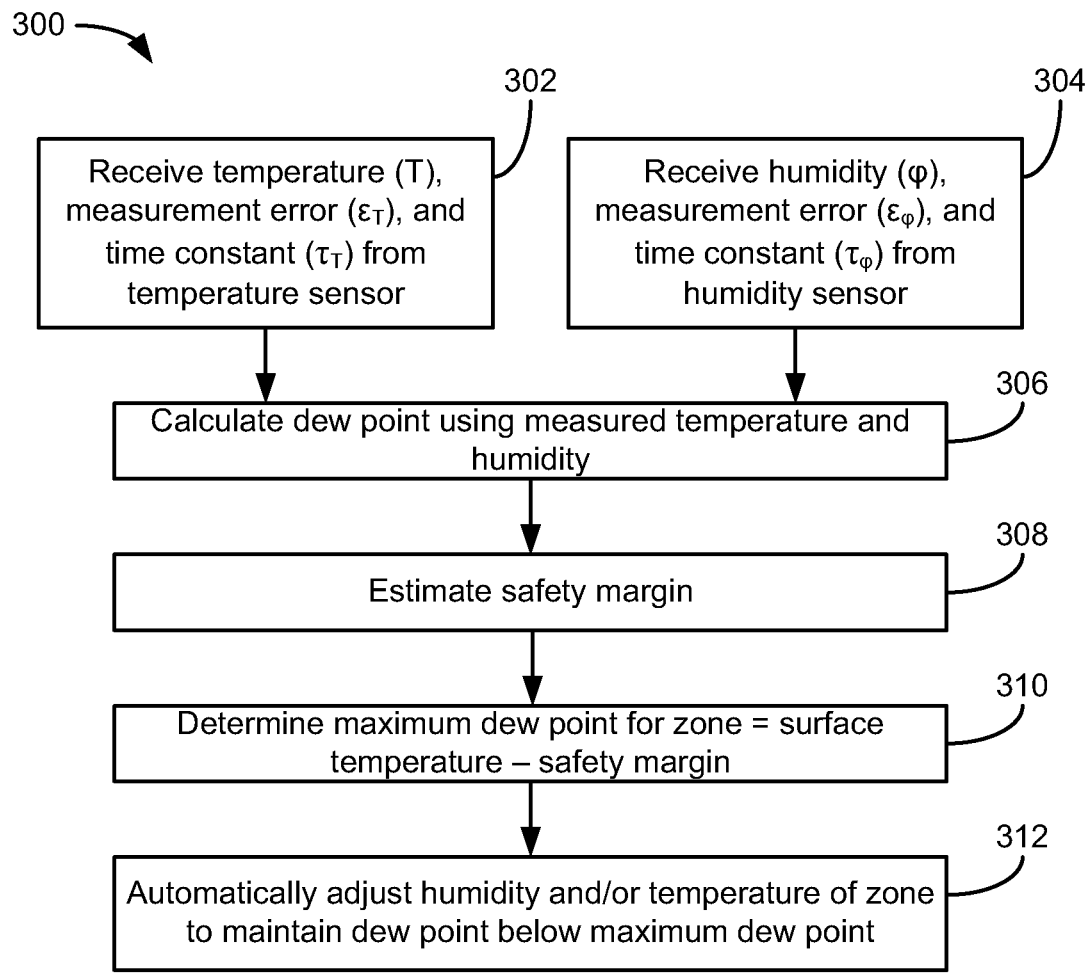
FIG. 3 is a flow diagram of a process for maintaining the dew point of a zone below a maximum dew point, according to an exemplary embodiment.

Referring now to FIG. 3, a flow diagram of a process 300 for maintaining the dew point of a zone below a maximum dew point is shown, according to an exemplary embodiment. Process 300 may be implemented on, e.g., the processing circuit of dew point apparatus 102.

Process 300 includes receiving data from a device configured to measure temperature (302), receiving data from a device configured to measure relative humidity (304), calculating the dew point using the measured temperature and humidity (306), and estimating the safety margin (308). Steps 302, 304, 306, and 308 may be substantially similar to steps 202, 204, 206, and 208 of process 200 (FIG. 2).

Process 300 includes determining the maximum dew point temperature of the zone (310). As described in the discussion of minimum surface temperature calculator 162 (FIG. 1B), the upper limit of the dew point calculation may be used to calculate the maximum dew point temperature. According to an exemplary embodiment, the maximum dew point temperature may be the difference of the current surface temperature (measured, e.g., by the chilled beam system) and the safety margin estimated in step 308.

Process 300 includes automatically adjusting the temperature and/or humidity of the zone to maintain the current dew point below the maximum dew point. Dew point apparatus 102 may transmit commands to one or more components of the BAS, e.g., a HVAC system, to increase the flow of supplemental air into the zone. This may cause, e.g., a decrease in temperature and/or humidity of the zone. Based the psychometric equations, a decrease in temperature and/or humidity may cause a decrease in the dew point.

In some embodiments, process 300 additionally includes determining whether the difference between the surface temperature and the dew point is greater than the safety margin, and adjusting the current surface temperature and/or the dew point, as described in the discussion of process 200 (FIG. 2).

Figure 4:
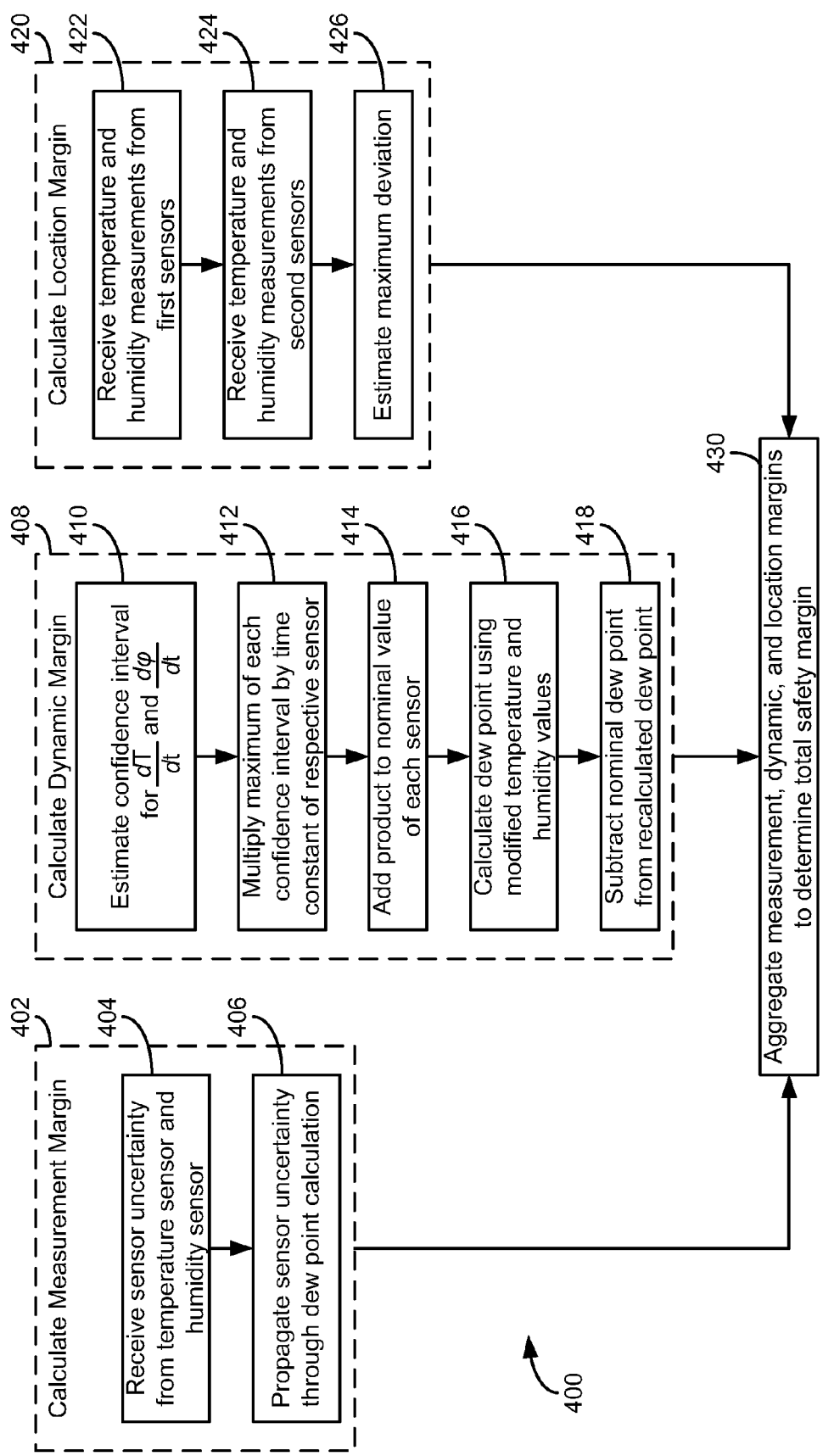
FIG. 4 is a flow diagram of a process for determining a safety margin, according to an exemplary embodiment.

Referring now to FIG. 4, a flow diagram of a process 400 for determining the safety margin is shown, according to an exemplary embodiment. Process 400 may be implemented on, e.g., the processing circuit of dew point apparatus 102. Process 400 may be a more detailed description of step 208 of process 200 (FIG. 2) and step 308 of process 300 (FIG. 3).

Process 400 includes calculating the measurement margin (402), the dynamic margin (408), and location margin (420). The sensor uncertainties and time constants received from the temperature sensing device and the humidity sensing device may be used to calculate measurement margin and dynamic margin, respectively. According to an exemplary embodiment, a maximum deviation between two or more sets of temperature sensing and humidity sensing devices is used to calculate location margin.

Calculating measurement uncertainty includes receiving sensor uncertainty (or error) from temperature sensor and humidity sensor (404). The sensor uncertainty is described in the discussion of measurement uncertainty calculator 154 (FIG. 1B). Sensor uncertainty may be defined as a normal distribution or as a bounded error. Calculating the measurement margin includes propagating the sensor uncertainty through the dew point calculation (406). One embodiment of the mathematical methods utilized to propagate the sensor uncertainty is described in the discussion of measurement dew point uncertainty calculator 152 (FIG. 1B). In various embodiments, other mathematical methods may be used.

Calculating the dynamic margin includes estimating a confidence interval for the derivative of the temperature sensor readings and the derivative of the humidity sensor readings (410). As described in the discussion of dynamic margin calculator 160 (FIG. 1B), estimating the confidence interval includes estimating the temperature derivative and humidity derivative, as well as the uncertainty associated with each of the derivatives. A Savitzky-Golay filter or other mathematical methods may be used to estimate the derivatives and uncertainties. Calculating the dynamic margin includes multiplying the maximum of the temperature derivative confidence interval by the temperature sensor time constant and the maximum of the humidity derivative confidence interval by the humidity sensor time constant (412). In alternative embodiments, a maximum ramp rate or slope (i.e., derivative) for temperature and humidity may be specified and multiplied by the respective time constants. Calculating the dynamic uncertainty also includes adding the respective products from step 412 to the nominal readings from the temperature sensor and the humidity sensor (414). The dew point may be calculated (as described in the discussion of dew point calculator 150 of FIG. 1B) using the modified temperature and humidity values (from step 414) (416). The dynamic margin may be calculated by subtracting nominal dew point (calculated using the nominal readings from the temperature sensor and humidity sensor) from the recalculated dew point (from step 416) (418). According to an exemplary embodiment, the dynamic margin is forced to be greater than zero.

According to an exemplary embodiment, calculating the location uncertainty includes receiving temperature and humidity measurements from a first pair of temperature and humidity sensors (422) and from a second pair of temperature and humidity sensors (424). The first pair of sensors may be located remote from the second pair. One pair of sensors may be on or near the cooled surface, while the second pair is further away. Calculating the location uncertainty includes calculating a maximum deviation in the measurements received from the two pairs of sensors (or the maximum deviation in the dew point calculated from the measurements) over a period of time (426). The maximum deviation may be utilized as the location uncertainty. In some embodiments, the location uncertainty can be set to zero because the temperature and humidity sensor are on or near the cooled surface. In some embodiments, location uncertainty may be set to a user-specified number (e.g., 1° F.). This may be the case when the humidity is expected to be relatively uniformly distributed in the zone.

Process 400 includes aggregating the measurement margin, dynamic margin, and location margin to determine the total safety margin (430). In some embodiments, another function and/or another combination (e.g., less than three) of the margins are calculated and used to determine safety margin. In some embodiments, the three sources may be individually weighted when summed together.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A computerized method of maintaining a temperature of a surface in a building space above a dew point of the building space, the method comprising:
    calculating a dew point based on a temperature measurement and a relative humidity measurement;
    estimating a safety margin associated with the dew point calculation, wherein the safety margin comprises a function of at least one of: (a) a mathematical uncertainty associated with a measurement of at least one of the temperature of the building space and the humidity, (b) a mathematical uncertainty associated with a rate of change of the measurement of at least one of the temperature of the building space and the humidity, and (c) a mathematical uncertainty associated with a location of the measurement of at least one of the temperature of the building space and the humidity;
    determining a minimum temperature of the surface, wherein the minimum temperature is a function of the dew point and the safety margin; and
    commanding a first component of a building automation system to adjust a current temperature of the surface to be greater than the minimum temperature.

2. The method of claim 1, wherein the first component of the building automation system comprises a chilled beam system, and wherein the surface in the building space comprises a surface of the chilled beam system.

3. The method of claim 1, further comprising:
    calculating a temperature threshold, wherein the temperature threshold describes a difference between the current temperature of the surface and the dew point; and
    determining if the temperature threshold is greater than the safety margin.

4. The method of claim 3, further comprising:
    commanding, when the temperature threshold is not greater than the safety margin, a second component of the building automation system to decrease at least one of the temperature and relative humidity of the building space.

5. A computerized method of maintaining a temperature of a surface in a building space above a dew point of the building space, the method comprising:
    receiving a temperature of the building space;
    receiving a relative humidity of the building space;
    receiving at least one mathematical error associated with the temperature of the building space and at least one mathematical error associated with the relative humidity;
    calculating the dew point using the temperature of the building space and the relative humidity;
    calculating a mathematical uncertainty using the at least one mathematical error associated with the temperature of the building space and the at least one mathematical error associated with the relative humidity;
    determining a minimum temperature of the surface in the building space, wherein the minimum temperature is a function of the dew point and the mathematical uncertainty;
    receiving a current temperature of the surface in the building space;

commanding, when the current temperature is greater than the minimum temperature, a first component of a building automation system to maintain the current temperature; and commanding, when the current temperature is less than the minimum temperature, a first component of the building automation system to increase the current temperature.

6. The method of claim 5, wherein the first component of the building automation system comprises a chilled beam system, and wherein the surface in the building space comprises a surface of the chilled beam system.

7. The method of claim 5, further comprising:
calculating a temperature threshold, wherein the temperature threshold describes a difference between the current temperature of the surface and the dew point; and
determining if the temperature threshold is greater than the mathematical uncertainty.

8. The method of claim 7, further comprising:
commanding, when the temperature threshold is not greater than the mathematical uncertainty, a second component of the building automation system to decrease at least one of the temperature and relative humidity of the building space.

9. The method of claim 5, wherein the mathematical uncertainty comprises a function of at least one of (a) an uncertainty associated with a measurement of at least one of the temperature of the building space and the humidity, (b) an uncertainty associated with a rate of change of the measurement of at least one of the temperature of the building space and the humidity, and (c) an uncertainty associated with a location of the measurement of at least one of the temperature of the building space and the humidity.

10. A controller for maintaining a temperature of a surface in a building space above a dew point of the building space, the controller comprising:
a processing circuit configured to receive a temperature of the building space;
wherein the processing circuit is further configured to receive a relative humidity of the building space;
wherein the processing circuit is further configured to receive at least one mathematical error associated with the temperature of the building space and at least one mathematical error associated with the relative humidity;
wherein the processing circuit is further configured to calculate the dew point using the temperature of the building space and the relative humidity;
wherein the processing circuit is further configured to calculate a mathematical uncertainty using the at least one mathematical error associated with the temperature of the building space and the at least one mathematical error associated with the relative humidity;
wherein the processing circuit is further configured to determine a minimum temperature of the surface in the building space, the minimum temperature being a function of the dew point and the mathematical uncertainty;
wherein the processing circuit is further configured to receive a current temperature of the surface in the building space;
wherein the processing circuit is further configured to command, when the current temperature is greater than the minimum temperature, a first component of a building automation system to maintain the current temperature; and wherein the processing circuit is further configured to command, when the current temperature is less than the minimum temperature, a first component of the building automation system to increase the current temperature.

11. The controller of claim 10, wherein the first component of the building automation system comprises a chilled beam system, and wherein the surface in the building space comprises a surface of the chilled beam system.

12. The controller of claim 10, wherein the processing circuit is further configured to:
calculate a temperature threshold, the temperature threshold describing a difference between the current temperature of the surface and the dew point; and
determine if the temperature threshold is greater than the mathematical uncertainty.

13. The controller of claim 12, wherein the processing circuit is further configured to:
command, when the temperature threshold is not greater than the mathematical uncertainty, a second component of the building automation system to decrease at least one of the temperature and relative humidity of the building space.

14. The controller of claim 10, wherein the mathematical uncertainty comprises a function of at least one of (a) an uncertainty associated with a measurement of at least one of the temperature of the building space and the humidity, (b) an uncertainty associated with a rate of change of the measurement of at least one of the temperature of the building space and the humidity, and (c) an uncertainty associated with a location of the measurement of at least one of the temperature of the building space and the humidity.

15. A computerized method of maintaining a dew point of a building space below a temperature of a surface in the building space, the method comprising:
receiving a temperature of the building space;
receiving a relative humidity of the building space;
receiving at least one mathematical error associated with the temperature of the building space and at least one mathematical error associated with the relative humidity;
calculating the dew point using the temperature of the building space and the relative humidity;
calculating a mathematical uncertainty using the at least one mathematical error associated with the temperature of the building space and the at least one mathematical error associated with the relative humidity;
determining a maximum dew point, wherein the maximum dew point is a function of a current temperature of the surface and the mathematical uncertainty;
commanding, when the dew point is less than the maximum dew point, a second component of a building automation system to maintain at least one of the temperature and the relative humidity of the building space; and
commanding, when the dew point is greater than the maximum dew point, the second component of the building automation system to decrease at least one of the temperature and the relative humidity of the building space.

16. The method of claim 15, wherein the second component of the building automation system comprises a heating, ventilation, and air conditioning (HVAC) system.

17. The method of claim 15, further comprising:
calculating a temperature threshold, wherein the temperature threshold describes a difference between the current temperature of the surface and the dew point; and
determining if the temperature threshold is greater than the mathematical uncertainty.

18. The method of claim 17, further comprising:
commanding, when the temperature threshold is not greater than the mathematical uncertainty, a first component of the building automation system to increase the temperature of the surface in the building space.

19. The method of claim 15, wherein the mathematical uncertainty comprises a function of at least one of (a) an uncertainty associated with a measurement of at least one of the temperature of the building space and the humidity, (b) an uncertainty associated with a rate of change of the measurement of at least one of the temperature of the building space and the humidity, and (c) an uncertainty associated with a location of the measurement of at least one of the temperature of the building space and the humidity.

20. A controller for maintaining a dew point of a building space below a temperature of a surface in the building space, the controller comprising:
a processing circuit configured to receive a temperature of the building space;
wherein the processing circuit is further configured to receive a relative humidity of the building space;
wherein the processing circuit is further configured to receive at least one mathematical error associated with the temperature of the building space and at least one mathematical error associated with the relative humidity;
wherein the processing circuit is further configured to calculate the dew point using the temperature of the building space and the relative humidity;
wherein the processing circuit is further configured to calculate a mathematical uncertainty using the at least one mathematical error associated with the temperature of the building space and the at least one mathematical error associated with the relative humidity;
wherein the processing circuit is further configured to determine a maximum dew point, the maximum dew point being a function of a current temperature of the surface and the mathematical uncertainty;
wherein the processing circuit is further configured to command, when the dew point is less than the maximum dew point, a second component of a building automation system to maintain at least one of the temperature and the relative humidity of the building space; and
wherein the processing circuit is further configured to command, when the dew point is greater than the maximum dew point, the second component of the building automation system to decrease at least one of the temperature and the relative humidity of the building space.

21. The controller of claim 20, wherein the second component of the building automation system comprises a heating, ventilation, and air conditioning (HVAC) system.

22. The controller of claim 20, wherein the processing circuit is further configured to:
calculate a temperature threshold, the temperature threshold describing a difference between the current temperature of the surface and the dew point; and
determine if the temperature threshold is greater than the mathematical uncertainty.

23. The controller of claim 22, wherein the processing circuit is further configured to:
command, when the temperature threshold is not greater than the mathematical uncertainty, a first component of the building automation system to increase the temperature of the surface in the building space.

24. The controller of claim 20, wherein the mathematical uncertainty comprises a function of at least one of (a) an uncertainty associated with a measurement of at least one of the temperature of the building space and the humidity, (b) an uncertainty associated with a rate of change of the measurement of at least one of the temperature of the building space and the humidity, and (c) an uncertainty associated with a location of the of the measurement of at least one of the temperature of the building space and the humidity.

* * * * *